(12) United States Patent
Schmidt (10) Patent No.: US 6,856,388 B2
(45) Date of Patent: Feb. 15, 2005

(54) OPTICAL SENSOR FOR MEASURING THE DISTANCE AND/OR INCLINATION OF A SURFACE

(75) Inventor: Stefan Schmidt, Kiel (DE)

(73) Assignee: Carl Zeiss Jena GmbH, Jena (DE)

( * ) Notice: Subject to any disclaimer, the term of this patent is extended or adjusted under 35 U.S.C. 154(b) by 0 days.

(21) Appl. No.: 10/048,334

(22) PCT Filed: May 10, 2001

(86) PCT No.: PCT/EP01/05336
§ 371 (c)(1),
(2), (4) Date: May 17, 2002

(87) PCT Pub. No.: WO01/92819
PCT Pub. Date: Dec. 6, 2001

(65) Prior Publication Data
US 2002/0180989 A1 Dec. 5, 2002

(30) Foreign Application Priority Data
May 30, 2000 (DE) .......................................... 100 26 830

(51) Int. Cl.⁷ .............................................. G01B 11/26
(52) U.S. Cl. ............................... 356/152.2; 356/141.5; 356/622
(58) Field of Search ............................... 356/622, 623, 356/3.08, 139.03, 141.5, 152.2

(56) References Cited

U.S. PATENT DOCUMENTS 4,477,185 A * 10/1984 Berger et al.
4,823,014 A * 4/1989 Miyawaki
4,888,490 A * 12/1989 Bass et al.
6,091,499 A * 7/2000 Abraham et al.

FOREIGN PATENT DOCUMENTS

| DE | 34 07 074 | | 8/1985 |
| EP | 0 145 957 | | 6/1985 |
| JP | 401035305 A | * | 2/1989 |
| WO | WO 88/07657 | | 10/1988 |

OTHER PUBLICATIONS

Patent Abstracts of Japan—58–165007 Sep. 30, 1983, Hitachi Seisakusho KK.

* cited by examiner

Primary Examiner—Thomas H. Tarcza
Assistant Examiner—Isam Alsomiri
(74) Attorney, Agent, or Firm—Reed Smith LLP (57) ABSTRACT

An optical sensor for measuring the distance and/or inclination of a surface, particularly relative to a reference plane, or for detecting the distance and/or change in inclination of a surface, wherein a light spot is generated on a detector in that a light beam that is collimated in a first direction is focused in a direction perpendicular to the first direction, so that a line focus is effected along the first direction on the surface and the line focus is imaged on the detector in the second direction and, at the same time, the beam that is reflected at the surface and collimated in the first direction is focused on the detector, wherein the line focus is perpendicular to the reflection plane defined by the impinging, reflected beam.

9 Claims, 7 Drawing Sheets

Fig. 1a
Meridional beam path

Fig. 1b
Sagittal beam path
(in vertical projection on the reference plane)

Fig. 1c
Meridional beam path

Fig. 2

The light reflected at the upper side of the substrate does not reach the detector Fig. 3 Substrate along the normal line shifted from the focal plane (defocused)

Fig 4
Substrate tilted about the axis perpendicular to the meridional plane

Fig. 6
Top view of two orthogonally arranged sensor beam paths
for simultaneous detection of the inclination around two axes

US 6,856,388 B2

OPTICAL SENSOR FOR MEASURING THE DISTANCE AND/OR INCLINATION OF A SURFACE

CROSS-REFERENCE TO RELATED APPLICATION

This application claims priority of International Application No. PCT/EP01/05336, filed May 10, 2001 and German Application No. 100 26 830.7, filed May 30, 2000, the complete disclosures of which are hereby incorporated by reference.

BACKGROUND OF THE INVENTION

In many applications, it is required to focus on an interface rather than on a surface. This is the case whenever the preparation is protected or held by a transparent medium and is to be observed through the transparent medium. Examples are cover slips in microscopy, the specimen carrier glass when the specimen is to be observed from below, and specimen vessels such as microtiter plates or cuvettes in which the preparation to be examined collects on the transparent bottom or cuvette wall.

When the surface to be observed is very large, not only is it necessary to focus the specimen in the center of the visual field, but the plane to be observed must also be oriented with respect to its inclination so that the entire object plane is imaged sharply. The inclination must be oriented with respect the optical axis of the objective used for observation when the objective comprehends the observed surface in its entirety, or with respect to the plane in which the specimen is moved when the surface is scanned, so that it may be detected in its entirety.

In the case with which the invention is concerned, molecules are bound to a glass substrate which must be focused with respect to an objective for observing the fluorescence of these molecules. Since the visual field of the objective is very large and the depth of focus is very small, the substrate must be oriented with respect to the optical axis of the objective so that the entire surface occupied by molecules can be detected with uniform quality. The fluorescence is observed through the substrate, so that the back of the substrate which is populated by molecules, rather than the front side of the substrate, must be focused and oriented.

OBJECT AND SUMMARY OF THE INVENTION

It is the primary object of the invention to determine the inclination and the distance of the back of a glass substrate with respect to the reference plane.

In accordance with the invention, an optical sensor for measuring the distance and/or inclination of a surface, particularly relative to a reference plane, or for detecting the distance and/or change in inclination of a surface, comprises a light spot generated on a detector which includes a light source for generating a light beam, means for collimating the light beam in a first direction, means for focusing the collimated light in a second direction perpendicular to the first direction, so that a line focus is effected along the first direction on the surface and the line focus is imaged on the detector in the second direction. Means are provided for focusing, at the same time, the beam reflected at the surface and collimated in the first direction so as to be focused on the detector. The line focus is perpendicular to the reflection plane defined by the impinging, reflected beam.

The sensor must detect three coordinates: the focusing, that is, the vertical distance from the substrate to the reference plane (nominal object plane) at a determined point and the inclination around two axes which are orthogonal to one another and located in the reference plane.

The three detected coordinates may not influence one another. That is, an inclination of the substrate with respect to one of the two axes may influence neither the measurement of the inclination with respect to the other axis nor the measurement of the distance. Influence must at least be adequately small and must vanish near optimal orientation and focusing of the substrate.

This condition arises from the aim of orienting the specimen based on the measurements of the sensor. If the deviation from the reference position in one coordinate has too much influence on the measurement results, no convergent algorithm can be indicated for orienting the specimen.

In the case of substrates with wedge errors and thicknesses that are not exactly defined, another difficulty consists in separating the rays reflected by the front and the back of the substrate in order to specifically determine the inclination and focusing of one side. A clean separation is particularly indispensable when the observed interface has a lower reflectivity. This occurs, for example, when the inner surface of a cuvette filled with aqueous solution is to be oriented. Due to the smaller jump in the index of refraction between the liquid and the glass compared with the jump in the index of refraction between air and glass, the reflection at the inner surface is much smaller than the reflection at the outer side.

Basic Measuring Methods:

The inclination is detected by means of a collimated laser beam. The beam is reflected at the interfaces of the substrate and the deviation of the reflected beam from its direction defined by the reference position is determined.

The distance is determined based on the triangulation principle. A slender bundle of light, for example, a laser beam, is directed to the point to be measured. Observation is carried out from a direction other than the illumination direction. Ideally, observation is carried out from the direction in which the illumination beam is reflected. This is a prerequisite in the case of non-scattering specimens in order for the light to be observed at all. The light spot (12) on the specimen is imaged through optics onto a position-sensitive detector (e.g., a CCD array). When the specimen is moved in the direction of the normal line of the substrate, the image of the light spot (12) on the detector moves away from its location defined by the reference position. The distance from the reference position is a measurement for the displacement along the direction of the surface normal.

DESCRIPTION OF THE INVENTION INCLUDING PREFERRED EMBODIMENTS

The invention advantageously combines an inclination sensor and a triangulation sensor in a single beam path.

Since only the inclination of an interface is to be determined, the reflected beams from the front and back of the substrate must be separated.

According to the invention, this object is met by anamorphotic optics which focus the laser beam meridionally on the surface to be measured, while the beam is collimated sagittally. The meridional plane is the plane in which the beam path of the sensor is located and which extends perpendicular to the reference plane.

Figures 1A, 1B:
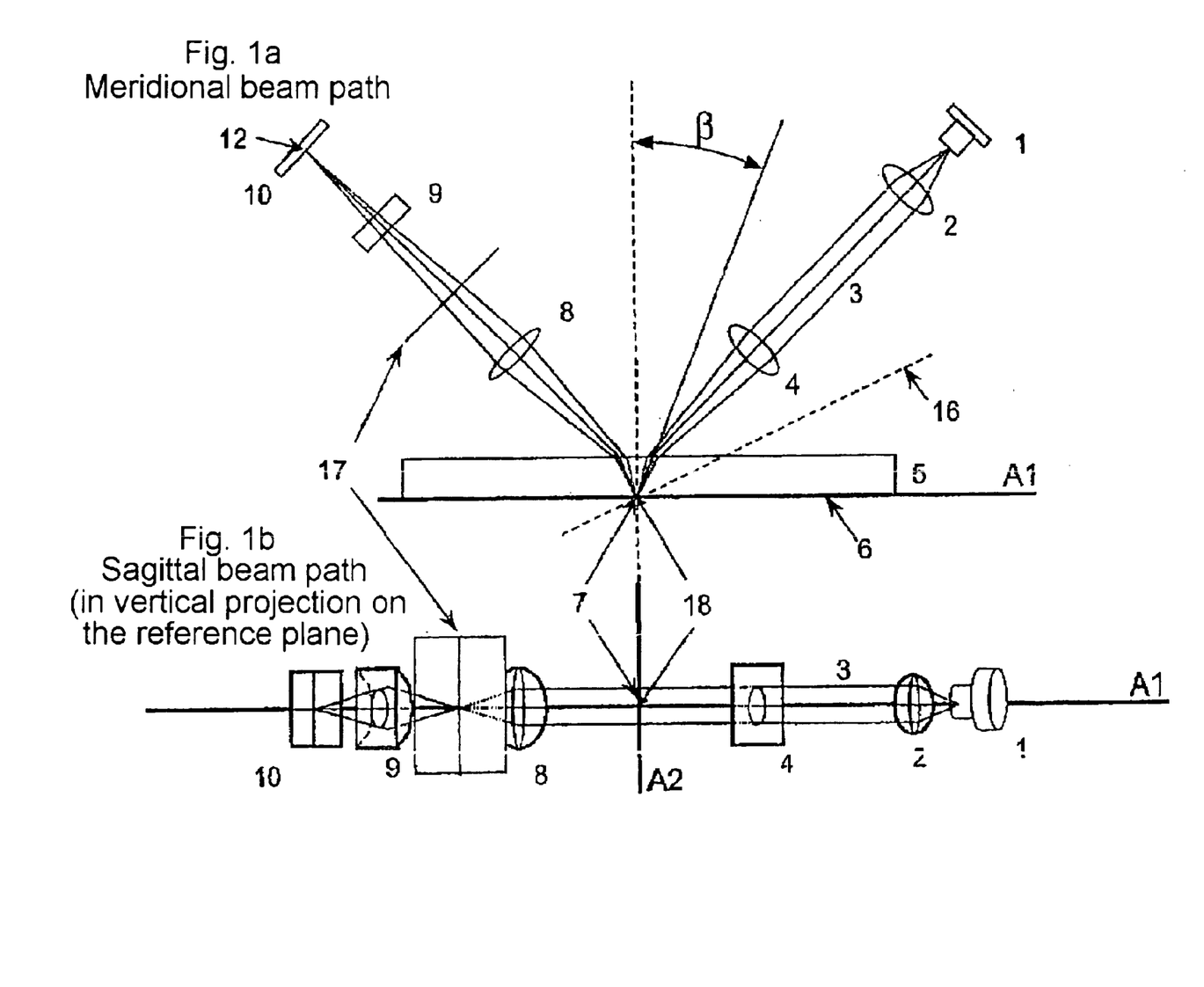
FIGS. 1a, 1b and 1c illustrate an example of the beam path according to the invention.
Figure 1C:
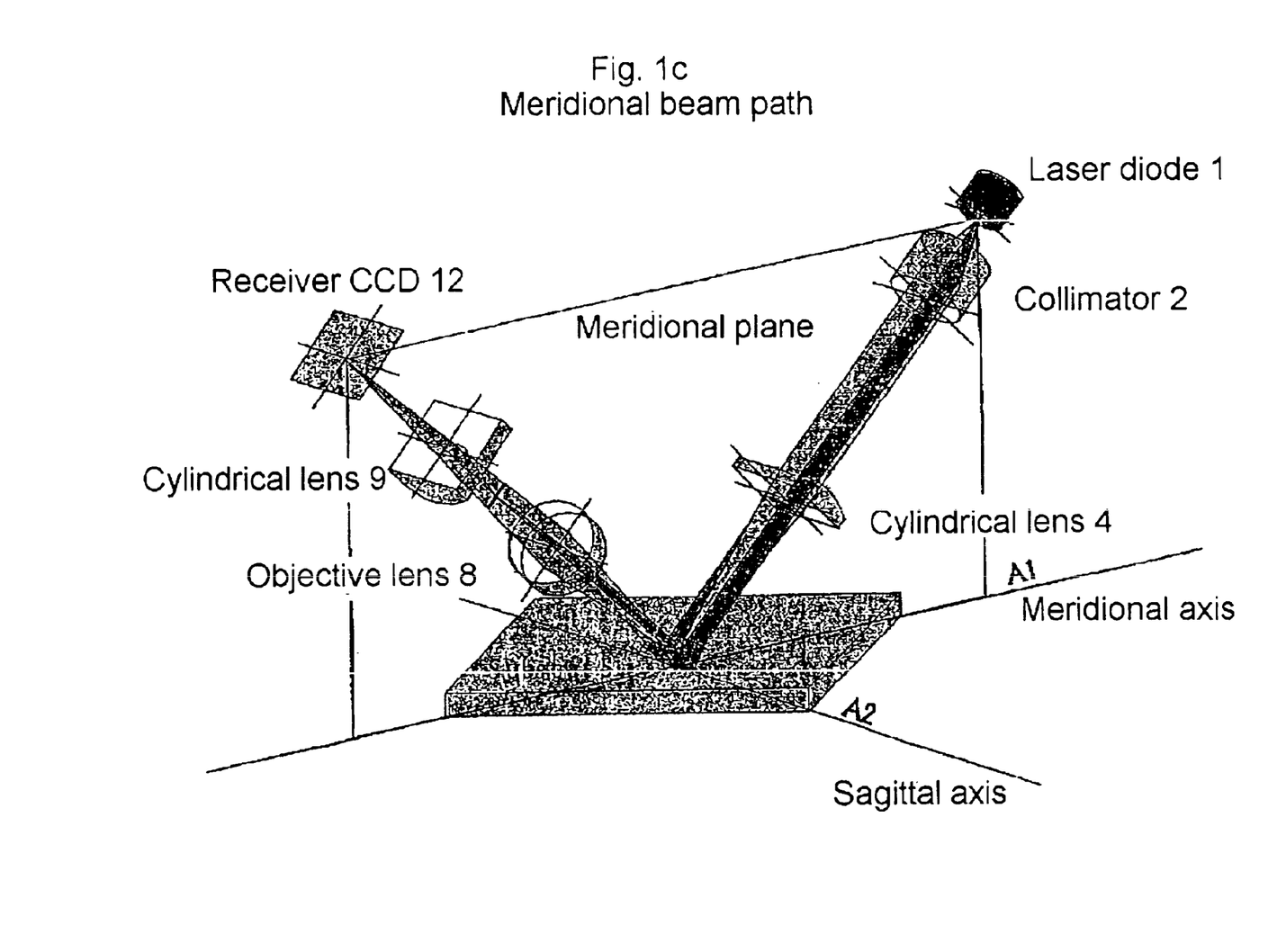

An embodiment example of the beam path according to the invention is shown in FIGS. 1a, 1b and 1c. The drawing plane of FIG. 1a is the meridional plane and a projection of the beam path according to the invention is shown on the reference plane in FIG. 1b.

The measurement point (18) is imaged meridionally on the position-sensitive detector (10) (e.g., CCD array) in the reference plane (6) in which distance and inclination are to be determined. In accordance with the triangulation principle, this imaging is used to determine the distance of the surface or interface of the substrate (5) to be measured from the reference plane (6) at the measurement point (18).

Figure 2:
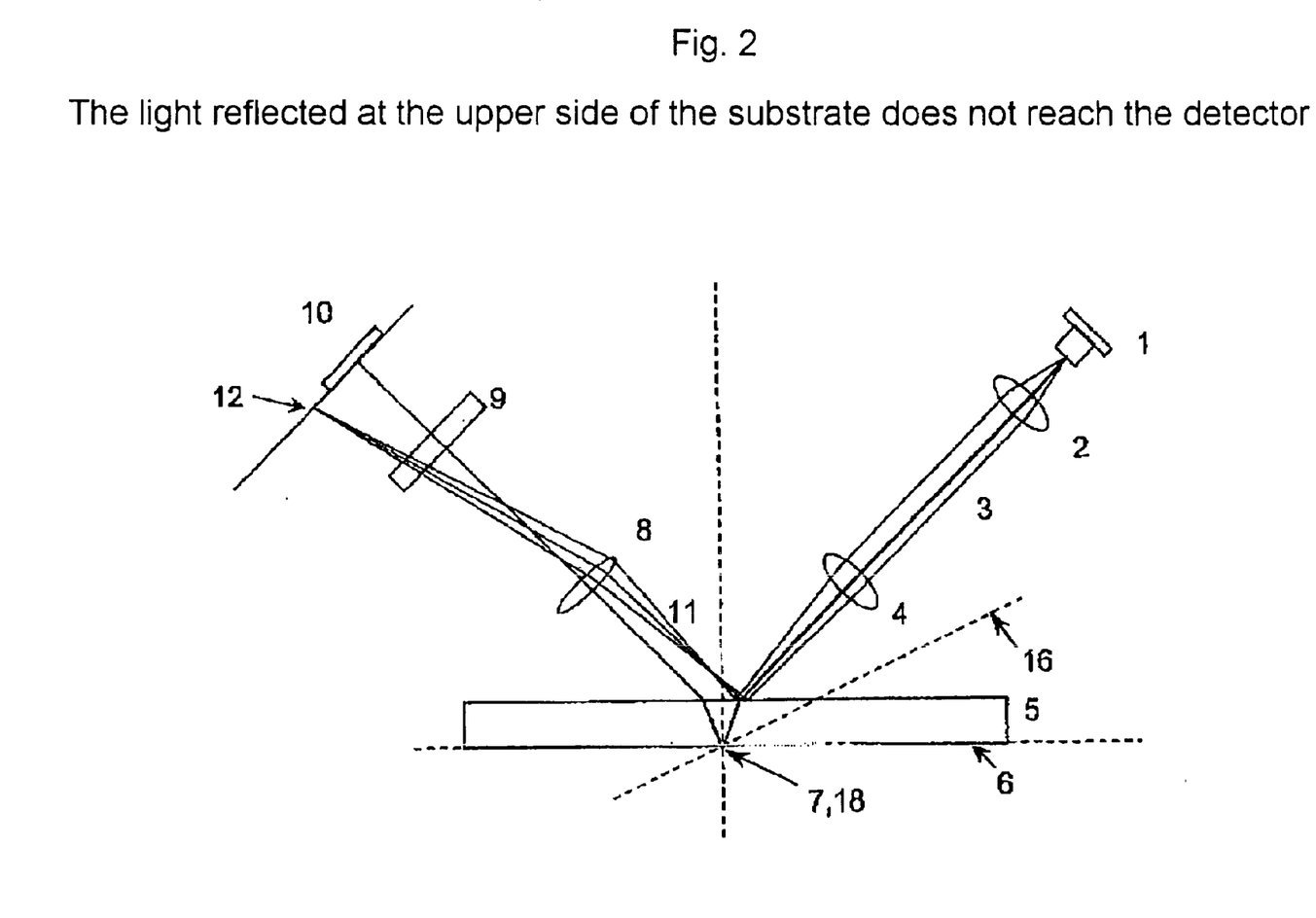
FIG. 2 shows the reflection of the light bundle at the front side of the substrate which is not measured.

FIG. 2 shows the reflection of the light bundle (11) at the front side of the substrate which is not to be measured. As in FIG. 1, the drawing plane is the meridional plane.

The beam reflected on the interface not under consideration (front side) is not imaged on the detector (10) since this interface lies outside the visual field of the detector (10) (capture range of the distance sensor). Accordingly, it no longer overlaps the beam reflected on the interface being considered and therefore disturbs neither the distance measurement nor the determination of inclination of this interface.

Figure 3:
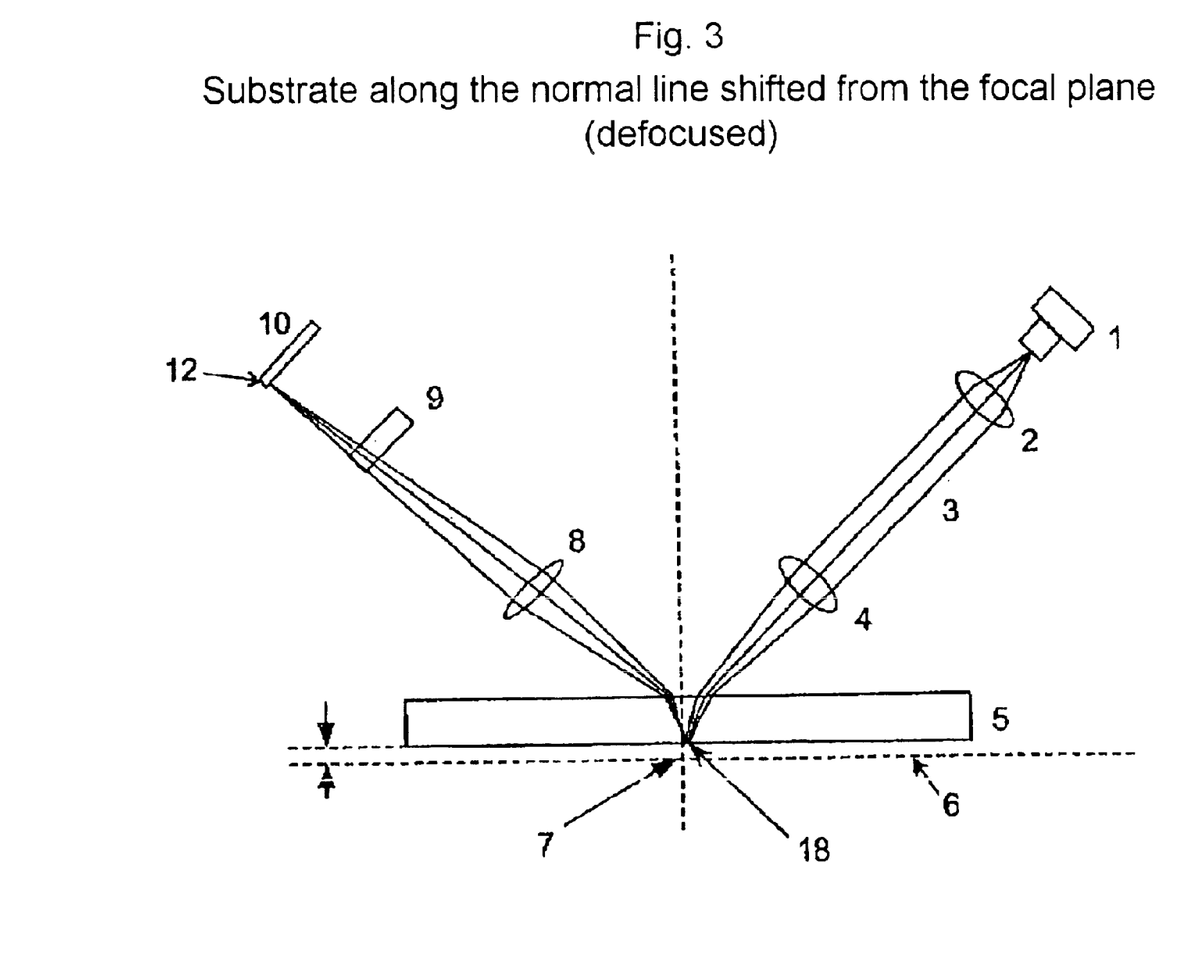
FIG. 3 shows in the substrate from its reference position in the direction of the normal line on the reference plane.

FIG. 3 shows the substrate from its reference position in the direction of the normal line on the reference plane (6). As in FIG. 1a, the drawing plane is the meridional plane. The line focus (7) is shifted relative to the measurement point (18) and is no longer imaged through the lens (8) on the location on the detector defined by the reference position.

The position of the light spot (12) generated on the position-sensitive detector (10) accordingly represents the distance of the substrate vertical to the reference plane at the measurement point (18).

Figure 4:
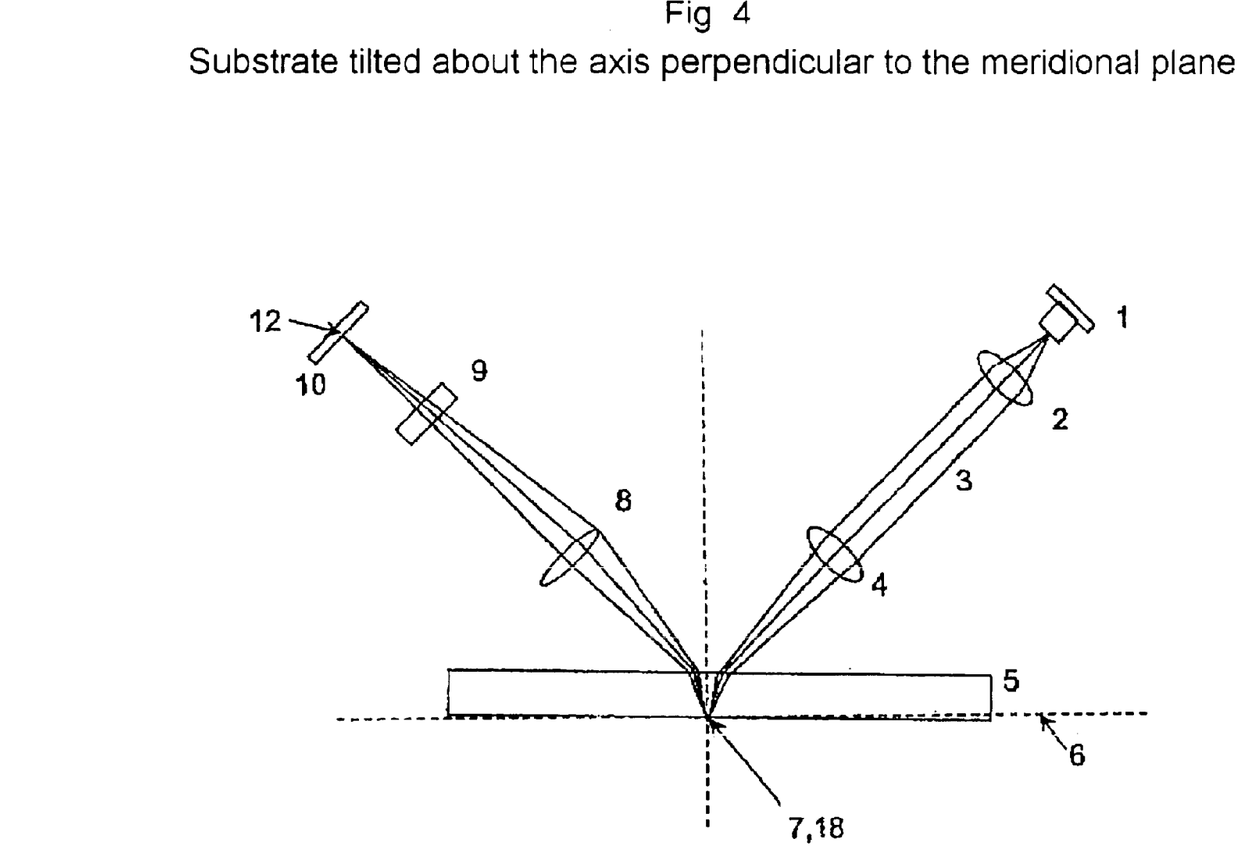
FIG. 4 shows the inclination of the substrate around an axis perpendicular to the drawing plane which goes through the measurement point.

FIG. 4 shows the inclination of the substrate around an axis (A2) perpendicular to the drawing plane which goes through the measurement point (18). The drawing plane in FIG. 4 is the meridional plane of the beam path. Since the line focus (7) through the inclination of the substrate is not shifted relative to the measurement point (18), the light spot (12) is in its reference position on the detector (10).

Figure 5:
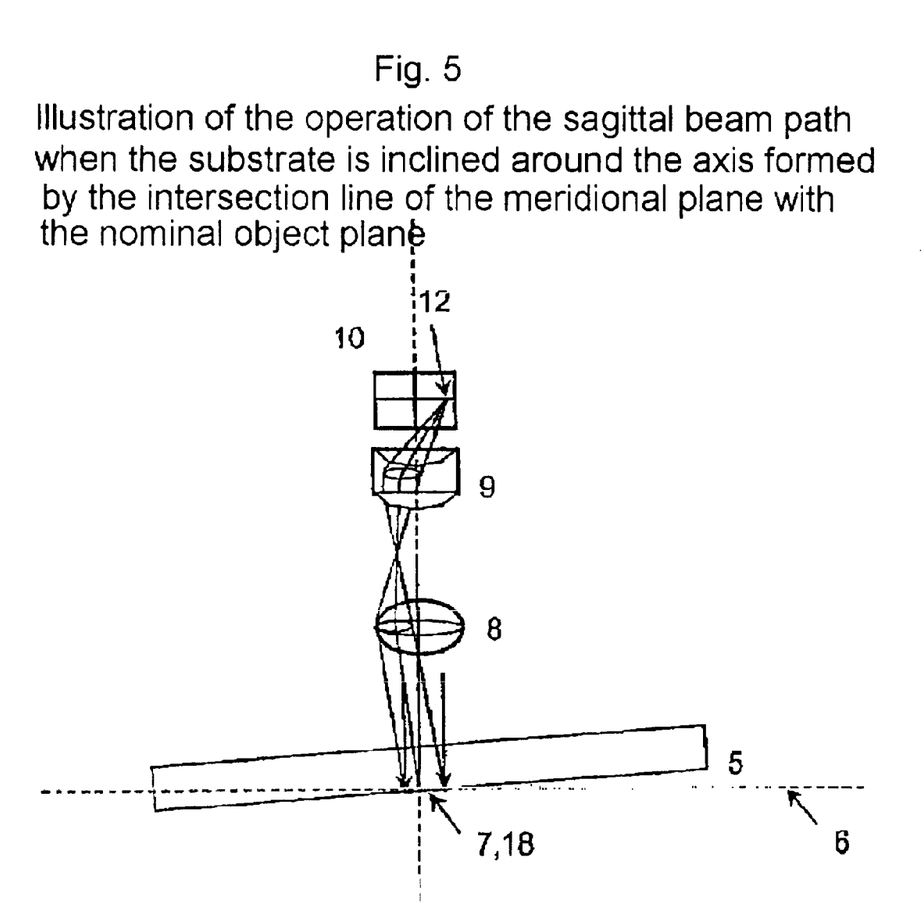
FIG. 5 shows a projection of the observation beam path on a plane perpendicular to the axis of rotation.

FIG. 5 shows a projection of the observation beam path on a plane perpendicular to the axis of rotation (A1). Apart from measuring the distance from the back of the substrate to the measurement point (18), the beam path according to the invention will also measure the inclination of the substrate around the axis of rotation (A1) located in the meridional plane (drawing plane of FIGS. 1a, 2, 3, 4) and reference plane (6). The sagittally collimated beam reflected by the back of the substrate is focused sagittally on the detector (10) through the observation optics (lenses 8 and 9).

The position of the light spot (12) on the detector accordingly represents the beam direction in the sagittal plane and, therefore, the inclination of the substrate with respect to the axis of rotation (A1) which is formed by the intersection line of the meridional plane (drawing plane of FIGS. 1a, 2, 3, 4) and the reference plane (6 in FIG. 1a, drawing plane of FIG. 1b).

Figure 6:
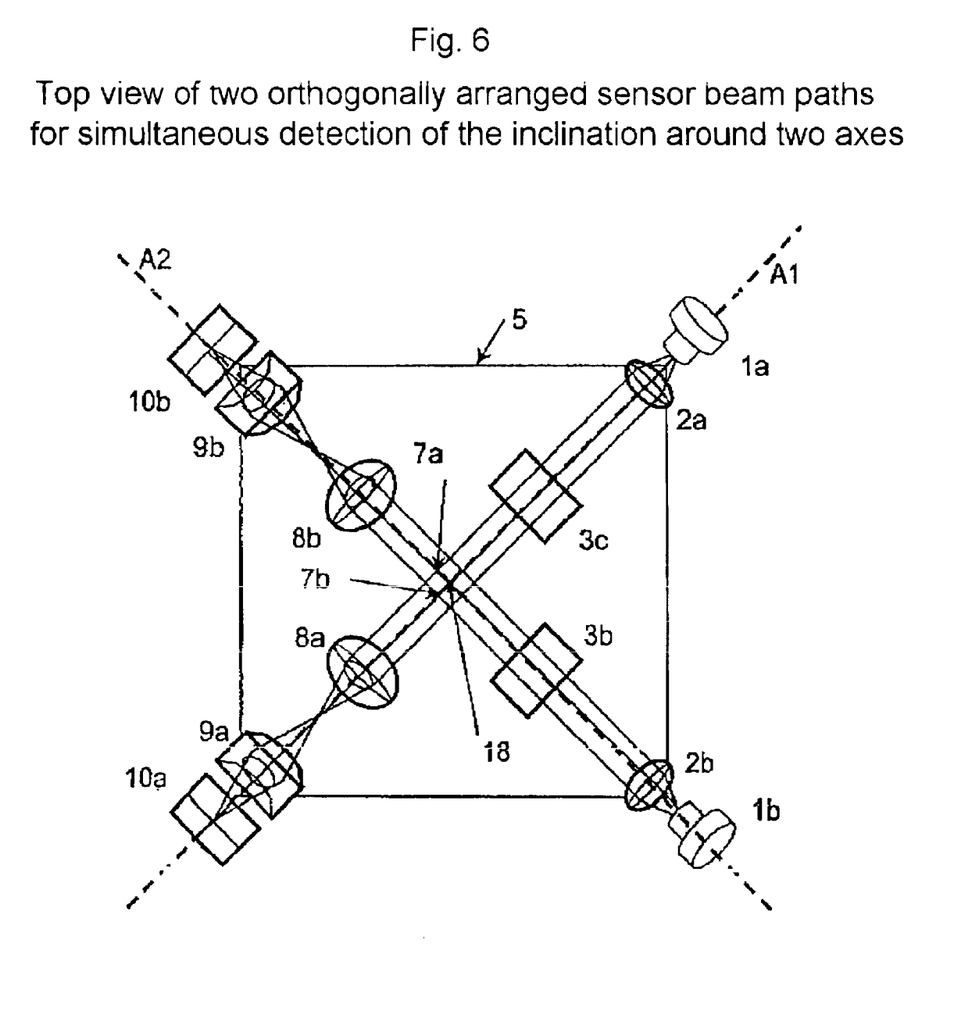
FIG. 6 is a top view of two orthogonally arranged sensor beam paths for simultaneous detection of the inclination around two axes.

FIG. 6 shows the projection of two beam paths on the reference plane (6) which are arranged at right angles to one another. In order to detect the inclination around a second axis orthogonal to the first axis, a second sensor of identical construction is arranged at right angles to the first sensor (see FIG. 6), so that the beams meet in the measurement point (18) in the reference plane (6).

EMBODIMENT EXAMPLE

FIG. 1 shows an embodiment example for the beam path according to the invention:

The beam emitted by a laser diode (1) is collimated through a lens (2). The collimated laser beam (3) is focused in meridional direction, that is, in the drawing plane of FIG. 1a, through a cylindrical lens (4) whose cylinder axis is perpendicular to the meridional plane, that is, the drawing plane of FIG. 1. The focal length and distance of the cylindrical lens from the substrate (5) are selected in such a way that the generated line focus (7) lies in the reference plane (6) which corresponds to the underside of the substrate in its reference position.

The light reflected at the underside of the substrate impinges on the objective lens (8). The objective lens (8) images the sensor object plane (16), which is tilted relative to the reference plane and extends perpendicular to the meridional plane (drawings plane of FIG. 1a), on a position-sensitive detector (10) (CCD array).

The light proceeding from the line focus (7) in whose center the measurement point (18) is located would accordingly be changed to a line on the detector (10). Since the reflected laser beam is collimated sagittally, that is, with respect to the direction perpendicular to the drawing plane of FIG. 1, it is focused through the objective lens in this direction in the plane (17).

In sagittal direction, that is, with respect to the direction perpendicular to the drawing plane in FIG. 1, the plane (17) is imaged in the detector plane through the cylindrical lens (9) whose cylinder axis is located in the meridional plane (drawing plane of FIG. 1a).

By means of the optics described above, the linear magnification or imaging scale between the sensor object plane (16) and detector (10) and the sagittal focal length of the observation optics comprising lenses (8) and (9) can be adapted to prevailing conditions.

In other words, the sagittal focal length $f_s$ of the observation optics, that is, the focal length with respect to the beam path perpendicular to the drawing plane of FIG. 1, is selected in such a way that the focus still strikes the detector surface of the detector (10) at the greatest expected inclination of the substrate.

Accordingly, it follows for the sagittal focal length $f_s$ that:

$$D_s/f_s \geq \tan(\alpha_{max}),$$

where $D_s$ is the edge length of the detector and $\alpha_{max}$ is the maximum angle of inclination accessible to measurement. The angle range of $+/-\alpha_{max}$ with respect to the reference position is then defined as the capture range.

Similarly, the imaging scale $v_m$ of the sensor object plane (16) on the detector (10) must be selected in such a way that the light spot (12) generated on the detector is still on the detector surface even with maximum defocusing $\Delta_{max}$. The maximum detected defocusing in the positive and negative direction from the reference position in the reference plane (6) defines the capture range for the distance sensor.

It must hold true for the imaging scale in meridional direction that:

$$D_m \geq v_m \Delta_{max} \sin(2\beta)/\cos(\beta),$$

where $D_m$ is the extension of the detector in meridional direction, that is, in the drawing plan of FIG. 1a, and the angle of incidence on the reference plane.

Ideally, all other optical interfaces lie outside of the capture range, so that the reflections at these interfaces do not generate a light spot (12) on the detector and do not interfere with the measurement at the observed surface.

In particular, in the embodiment example the surface of the substrate (5) lies outside the capture range of the distance sensor, namely, to the extent that the light reflected on the surface of the substrate does not strike the detector even in case of maximum defocusing of the substrate. Accordingly:

$$2D_m < v_m \Delta_{substrate} \sin(2\beta)/\cos(\beta),$$

where $\Delta_{substrate}$ is the thickness of the substrate (5).

A cylindrical lens whose cylinder axis extends perpendicular to the meridional plane can also be used instead of the spherical objective lens (8). In some circumstances, it can also be useful to construct the second lens in the observation beam path comprising lenses (8) and (9) as a spherical lens when the first lens is constructed as a cylindrical lens.

Naturally, it can also prove useful in principle to use lens groups instead of individual lenses for correcting imaging errors.

It is crucial that in the meridional plane an image of the sensor object plane in which a line focus of the laser beam is generated is brought about in the detector plane and the sagittally collimated laser beam reflected by the substrate is focused on the detector plane at the same time.

In this case, the position of the light spot (12) in the detector plane in the direction perpendicular to the meridional plane (drawing plane of FIGS. 1a, 2, 3, 4) shows the inclination of the substrate around the axis of rotation (A1) in the meridional plane and in the reference plane (6). The position of the light spot (12) in the detector plane in the direction orthogonal to this direction shows the deviation of the substrate interface in question at the measurement point (18) normal to the reference plane (6) (see FIG. 3).

Due to the optical arrangement according to the invention, measurement of the distance from the reference plane remains substantially unaffected by the inclination of the substrate. As is shown in FIG. 4, the inclination of the substrate around the axis (A2) extending perpendicular to the meridional plane (drawing plane of FIGS. 1a, 2, 3, 4) through the measurement point (18) has no influence, or at least very little influence, on the position of the light spot in the detector plane due to the imaging of the sensor object plane on the detector plane.

Likewise, the inclination of the substrate around the axis (A1) formed by the intersection line of the meridional plane (drawing plane of FIGS. 1a, 2, 3, 4) and reference plane (6) only influences the position of the light spot (12) perpendicular to the meridional plane (drawing plane of FIGS. 1a, 2, 3, 4) and essentially has no influence on the measurement of the distance from the reference pane at the measurement point.

The inclination of the substrate around the axis (A2) perpendicular to the meridional plane through the measurement point (18) or the distance of the substrate from the reference plane (6) at the measurement point (6) has no influence on the position of the light spot (12) perpendicular to the meridional plane (drawing plane of FIGS. 1a, 2, 3, 4).

While the foregoing description and drawings represent the present invention, it will be obvious to those skilled in the art that various changes may be made therein without departing from the true spirit and scope of the present invention.

What is claimed is:

1. An optical sensor for measuring the distance and/or inclination of a surface relative to a reference plane, or for detecting the distance and/or change in inclination of a surface, comprising:

a detector;

a light source operable to generate a light beam;

a collimator that collimates the light beam in a first direction;

a focusing element that focuses the collimated light in a second direction perpendicular to the first direction, so that a line focus is effected along the first direction on the surface and the line focus is imaged on the detector in the second direction; and the focusing element also focusing, at the same time, the light beam reflected at the surface and collimated in the first direction so as to be focused on the detector;

said line focus lying in the reference plane.

2. The optical sensor according to claim 1, wherein the size of the detector and the scale of enlargement and scale of reduction of imaging are adapted to one another in such a way that, apart from the light reflected at the surfaces or interfaces to be measured, no light reflected at other surfaces or interfaces strikes the detector.

3. The optical sensor according to claim 1, wherein the focusing element contains an anamorphotic element.

4. The optical sensor according to claim 3, wherein the focusing element contains a cylindrical lens.

5. The optical sensor according to claim 1, wherein the line focus is imaged in an intermediate image plane in which is located a diaphragm whose dimensions and scale of enlargement or reduction of imaging are adapted to one another in such a way that, apart from the light reflected at the surface or interface to be measured, any light reflected at other surfaces or interfaces can not pass the diaphragm and is accordingly kept away from the detector of the sensor.

6. The optical sensor according to claim 1, wherein the inclination and/or distance are/is determined on a one-dimensional or two-dimensional position-sensitive detector.

7. The optical sensor according to claim 1, wherein the inclination and/or distance are/is determined by the ratio of the signals of a quadrant detector.

8. A combination of a plurality of optical sensors according to claim 7, whose light bundles impinge on the surface from different directions for the purpose of detecting the inclination around a plurality of axes simultaneously.

9. An optical sensor for measuring the distance and inclination of a substrate comprising:

a light source for generating a light beam;

optics for focusing the light beam in a meridional beam path and for generating a line focus in the substrate wherein the line focus is subsequently imaged on a position detector in the meridional beam path, said imaged line focus being used to determine a vertical distance of the substrate from a reference plane; and anamorphotic optics for focusing, at the same time, the light beam in a sagittal beam path so as to be collimated and focused on the detector to determine angular variations in the substrate.

* * * * *